Figure 1:
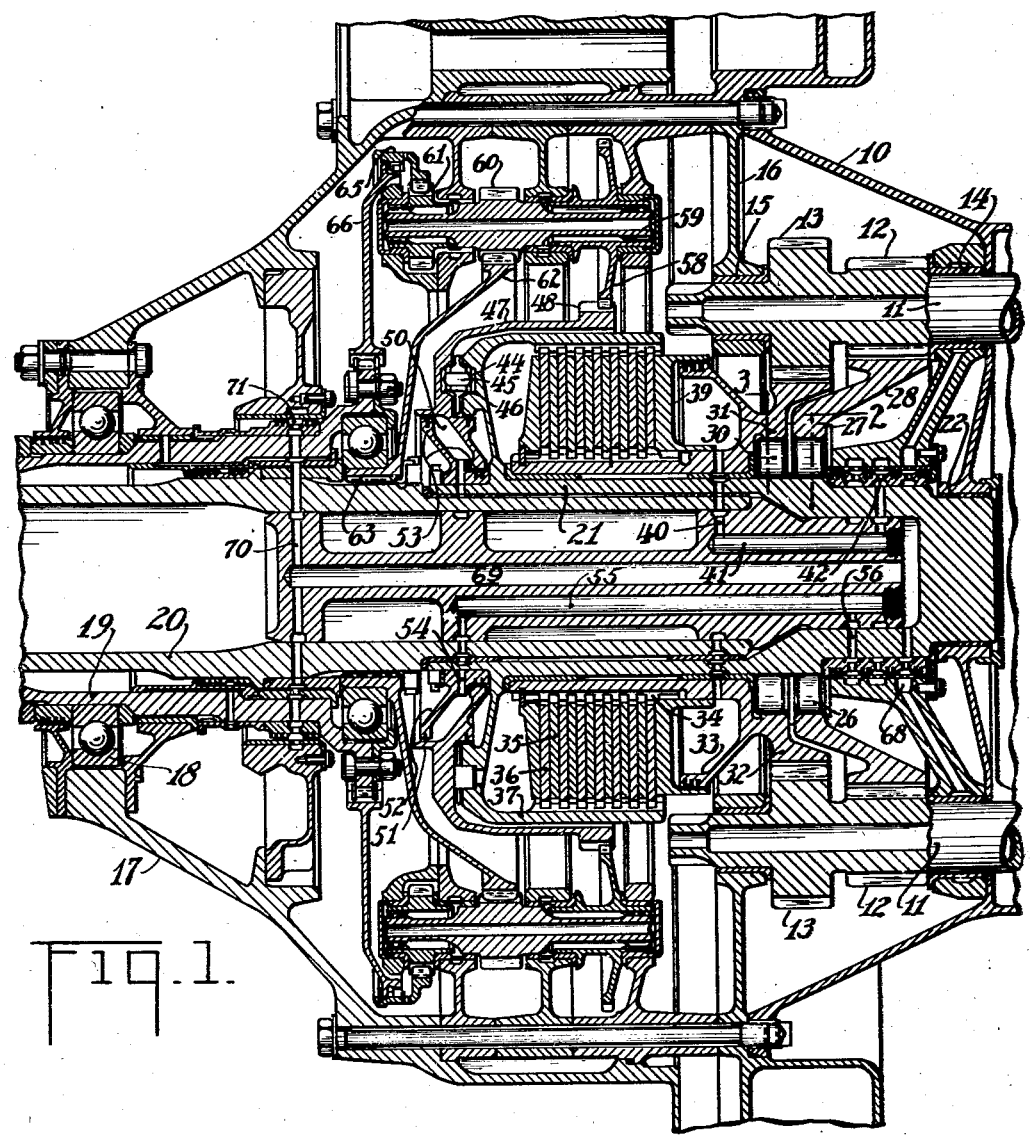

April 3, 1945.  R. DAUB  2,372,883

TWO-SPEED PROPELLER DRIVE

Filed Oct. 8, 1940

RUDOLPH DAUB.
INVENTOR

BY
ATTORNEY

Patented Apr. 3, 1945

2,372,883

UNITED STATES PATENT OFFICE 2,372,883

TWO-SPEED PROPELLER DRIVE

Rudolph Daub, Paterson, N. J., assignor to Wright Aeronautical Corporation, a corporation of New York Application October 8, 1940, Serial No. 360,230

6 Claims. (Cl. 74—368)

This invention relates to multi-speed gear transmissions and is particularly concerned with a two-speed propeller drive gear for aircraft. The invention in some respects is similar to that disclosed in the application for improvements in propeller drive gear, Serial No. 346,249, filed July 19, 1940, by Wilton G. Lundquist.

In the present invention, the functional results secured are similar to those obtained in the Lundquist invention, but the gear mechanism is quite different from that disclosed by Lundquist. The matter immediately following is taken from the Lundquist application and serves equally well in defining the objectives and utility of the present invention.

An object of the invention is to provide a selectively operable two-speed transmission between an aircraft engine and an aircraft propeller, the transmission in the aggregate including one drive ratio wherein the propeller rotates at a speed close to the rotational speed of the engine, and another ratio wherein the propeller operates at a substantially less speed than that of the engine. For purposes of identification in the ensuing description, the former will be referred to as the high ratio drive, and the latter as the low ratio drive.

A further object of the invention is to provide means by which the transmission will automatically go into the high ratio drive if a torque reversal takes place, regardless of the ratio selection for forward drive. That is, if the transmission is set for low ratio in normal drive where the engine drives the propeller, it will shift to high ratio if the propeller tends to drive the engine as might obtain in diving conditions of the aircraft or stalling of the aircraft engine in flight. By the same token, if the transmission is set for high ratio for normal engine to propeller drive, it will remain in that ratio should torque reversal take place. The advantage accruing from an arrangement such as that above indicated is that the propeller cannot freewheel with respect to the engine but constrains the latter to rotate with it, and does so under such a speed ratio condition that the propeller will have a large mechanical advantage in cranking the engine should the latter be stalled. Also, in diving conditions, this arrangement permits the propeller to rotate at high speed without over-speeding the engine proper.

Still another object is to provide a transmission which may be shifted under full load conditions, without decreasing engine power as would ordinarily be necessary.

The use of a two-speed propeller gear, particularly in high performance and high speed aircraft, becomes more and more desirable, which can be appreciated from the following example:

For take-off and climbing conditions, it is desirable to have the propeller rotate somewhere near full power engine speed—say 2400 R. P. M. for engines of present types. In this situation, the propeller pitch will be relatively flat in order to get maximum thrust under the low air speed conditions of take off and climb. For high speed level flight conditions, however, where the aircraft may be travelling at a speed of, say 400 miles per hour, the propeller advances into the relative wind so fast that the pitch thereof may be stepped up very steeply, while the propeller rotates at a relatively low R. P. M., whereby the propeller tip speed is held down to no more than about 1,000 feet per second, or below the velocity of sound. Thus, to obtain full power at high altitudes with the propeller adjusted as just mentioned, it is desirable to have a drive from the engine to the propeller whereby the engine may rotate at its full power speed—2400 R. P. M.— the example cited—while the propeller rotates at approximately one-half of such speed. Such a condition for engine-propeller ratio and propeller adjustment allows for maximum speed at optimum economy.

The high ratio drive, as above pointed out, is most desirable for conditions wherein the propeller tends to drive or overrun the engine and accordingly the invention provides means so that the transmission will be shifted to the high ratio drive after it is in the low ratio, or will remain in the high ratio drive after it is already there, when propeller overrun exists.

Figure 3:
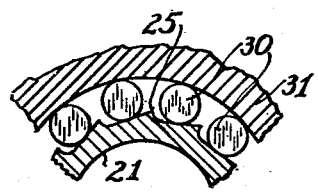
Figure 2:
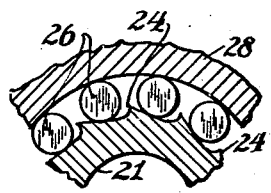

The details of the invention, along with further objects thereof, will become apparent in reading the annexed description in connection with the drawing, in which:

Fig. 1 is an axial section of a two-speed propeller drive transmission according to the invention, and adapted for the operation of two oppositely rotating concentric propellers; and Figs. 2 and 3 are fragmentary sections, respectively on the lines 2 and 3 of Fig. 1.

The number 10 designates a nose housing for an engine which extends on to the right of the figure, and a plurality of circumferentially arranged driveshafts 11 lie within the member 10 and form the power shafts from the engine. These shafts are each provided with a small pinion 12 and a large pinion 13, the several sets of pinions 12 and 13 respectively being coplanar and the shaft portions 11 adjacent said pinions being carried in bearings 14 and 15 mounted respectively in the member 10 and in a bearing diaphragm 16 secured thereto. A housing member 17 extends forwardly of the housing 16, the housing 17 having a nose bearing 18 piloting an outer propeller shaft 19 within which, in turn, is piloted an inner propeller shaft 20. The shaft 20 forms a journal for a driven shaft 21 whose rearward end is carried in a bearing 22 in the member 10.

On the outside of the driven shaft 21, in the zones of the section lines 2 and 3, one way roller clutch teeth 24 and 25 are formed, the sets of teeth 24 being of opposite hand from the sets of teeth 25. Disposed between the several teeth 24 are clutch rollers 26 embraced by the hub 27 of a gear 28 meshed with the drive pinion 12. Disposed between the teeth 25 are clutch rollers 30 embraced by the hub 31 of a member including a gear 32 meshed with the pinions 13, a clutch piston 33, and a splined clutch sleeve 34 upon which a plurality of clutch plates 35 are slidably mounted. Engaged between the clutch plates 35 are clutch plates 36 splined at their peripheries to a drum 37 integral with the driven shaft 21. At the righthand end of the stack of clutch plates 35 and 36 is a clutch cylinder 39 embracing the piston 33, and drillings 40 through the sleeve 34, the driven shaft 21, and the propeller shaft 20 establish communication from the chamber defined by the cylinder 39 and the piston 33 with a passage 41 leading to a fluid transfer bearing 42 to which pressure fluid may be selectively valved.

Considering the operation of the system thus far, clockwise rotation of the shafts 11 may be assumed when viewing the system from the righthand end. Thus, the gears 28 and 32 are continually driven in a counterclockwise direction at different speeds. When the clutch plates 35, 36 are disengaged, the driven shaft 21 is driven at low speed by the gear 28 operating through the clutch rollers 24. When the clutch plates 35 and 36 are engaged by valving pressure oil into the chamber between the cylinder 39 and the piston 33, the gear 32 is locked for unitary rotation with the driven shaft 21 whereupon said shaft overruns with respect to the gear 28 through the freewheeling action of the rollers 24.

When the gearset is in low ratio—that is, when the clutch plates 35, 36 are disengaged, and if the driven shaft 21 should tend to overrun the engine, the clutch rollers 30 will engage to provide a positive driving connection from the propeller shaft to the engine through the gear 32 and pinions 13 by which the high ratio drive is afforded when the direction of drive is reversed. By this means, when the propeller overruns the engine, it has a higher mechanical advantage than it would have if the low ratio drive were active, preventing excessive overspeeding of the engine under such conditions as might be encountered in diving. It will be seen that for the normal forward drive from engine to propellers, the low or high ratio may be selected at will, but if drive reversal takes place, the high ratio drive will come into action if the low ratio forward drive had been selected whereas, if the high ratio forward drive had been selected, the same ratio will persist when drive reversal takes place.

In the description thus far, the drive from the engine has been carried only as far as the driven shaft 21. This member includes a waved track 44 at its forward end upon which a series of rollers 45 bear which in turn bear upon a waved track 46 on an annular member 47 which embraces, in part, the clutch member 37 and carrier a gear 48. For driving purposes, the members 21 and 47 rotate together but are free for slight angular displacement which is translated by the rollers into axial displacement which is offset by a fluid pressure torque measuring cell 50 formed between a cylindrical portion 51 of the member 47 and a piston 52 slidable therein. The cylinder and piston are sealed with respect to one another by split rings 53, and drillings 54 in the hub of the piston 52 communicate with passages 55 in turn communicating with a transfer bearing 56 in the rear end of the driven shaft 21 and adjacent the transfer bearing 42. Oil under pressure is fed through the passages just mentioned to the cell 50, and this pressure resists relative axial movement of the members 47 and 37. The details of this torque measuring cell do not form an important phase of the present invention, but in principle, the cell is similar to that disclosed in Chilton application, Serial No. 248,053, filed December 28, 1938.

The gear 48 drives a plurality of gears 58 splined to layshafts 59 disposed around the gear. The layshafts 59 carry pinions 60 and pinions 61, the pinions 60 all being engaged with a propeller gear 62 splined at 63 to the inner propeller shaft 20, while the pinions 61 mesh with an internal gear 65 splined to a web 66 splined in turn to the outer propeller shaft 19. The final drive from the gear 48 to the propeller shafts gives a substantial reduction and likewise, as is obvious from the use of internal and external propeller gears 62 and 65, causes opposite rotation of the propeller shafts 19 and 20.

The drawing also shows an oil transfer bearing 68 feeding oil to a central passage 69 in the inner crankshaft whence it passes through drillings 70 to a transfer bearing 71, pressure oil being conducted therefrom to the front end of the gear housing.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination, an input shaft, a variable speed mechanism driven thereby, an output gear driven by said mechanism, a plurality of layshafts surrounding said output gear and a portion of said variable speed mechanism and each having a pinion engageable with said output gear, a pair of coaxial shafts concentric with said output gear, a driving connection from said layshafts to one of said coaxial shafts, and a reverse driving connection from said layshafts to the other of said coaxial shafts.

2. In combination, an input shaft, a pair of coaxial output shafts, means circumferentially disposed about the axis of said shafts having a driving connection to one of said shafts and a reverse driving connection to the other of said shafts, and a variable speed mechanism extending within the embrace of said means and drivably connected between said means and said input shaft.

3. In a multi-shaft drive organization, in combination, two concentric propeller shafts, a power input shaft, a driving connection between said power input shaft and said two concentric propeller shafts including a circle of layshafts spaced circumferentially about the axis of the latter, and a charge-speed gearing assembly likewise incorporated in said driving connection, said gearing assembly being adapted to receive within its embrace one end of one of said propeller shafts and being itself received, to a substantial extent, within the embrace of said circle of layshafts.

4. In a transmission, a pair of coaxial output shafts, a plurality of layshafts circumferentially spaced about the axis of said shafts and having a driving connection to one of said shafts and a reverse driving connection to the other of said shafts, a plurality of input shafts circumferentially spaced about the axis of said coaxial shafts, and a selectively operable variable speed mechanism driven by said input shafts and drivably connected to said layshafts, said mechanism being embraced by said circumferentially spaced layshafts and circumferentially spaced input shafts.

5. In combination, a plurality of high speed power shafts in circumferentially spaced relation on a circle, a selectively operable multispeed mechanism driven by said power shafts, said mechanism comprising an output gear, a plurality of layshafts disposed around said output gear and a portion of said mechanism, two propeller shafts concentric with said output gear, an internal gear on one shaft and an external gear on the other, and pinions on said layshafts with which said internal and external gears are meshed.

6. In a two-speed transmission, a plurality of circumferentially spaced input shafts, each shaft having a pair of pinions, a central gear meshed with each of said pinions, said central gears and associated pinions being of such relative size to provide a high and a low speed drive, a driven shaft, a one-way driving connection between each said central gear and said driven shaft, said one-way connections being of opposite hand, and a selectively operable clutch between the driven shaft and the central gear providing the high speed drive.

RUDOLPH DAUB.